United States Patent [19]

Rupprecht

[11] Patent Number: 5,388,671
[45] Date of Patent: Feb. 14, 1995

[54] ADJUSTING AND CENTERING MECHANISM ON THE SLIDING ADVANCE LOCK OF A SERVO DRUM BRAKE

[75] Inventor: Bernd Rupprecht, Edingen-Neckarhausen, Germany

[73] Assignee: Deutsche Perrot-Bremse GmbH, Mannheim, Germany

[21] Appl. No.: 112,067

[22] Filed: Aug. 26, 1993

[30] Foreign Application Priority Data

Aug. 26, 1992 [DE] Germany ............................ 4228296

[51] Int. Cl.$^6$ ........................................... F16D 65/52
[52] U.S. Cl. ............................ 188/79.51; 188/196 BA
[58] Field of Search ........................ 188/79.51–79.64, 188/196 B, 196 BA, 196 D, 196, 325, 331; 192/111 A

[56] References Cited

U.S. PATENT DOCUMENTS

| | | | |
|---|---|---|---|
| 3,326,331 | 6/1967 | Wallace | 188/79.5 |
| 3,712,425 | 1/1973 | Torii et al. | 188/79.5 |
| 4,570,506 | 2/1986 | Yamamoto et al. | 74/501.5 R |
| 4,919,237 | 4/1990 | Yamazaki | 188/79.62 |

FOREIGN PATENT DOCUMENTS

| | | |
|---|---|---|
| 2311166 | 12/1976 | Germany . |
| 3112550 | 8/1990 | Germany . |
| 4017096 | 12/1991 | Germany . |
| 1459872 | 12/1976 | United Kingdom . |
| 2099092 | 12/1982 | United Kingdom . |
| 2161874 | 1/1986 | United Kingdom . |

OTHER PUBLICATIONS

U.S. Patent application Ser. No. 07/706,305.

*Primary Examiner*—Robert J. Oberleitner
*Assistant Examiner*—Chris Schwartz
*Attorney, Agent, or Firm*—Jacobson, Price, Holman & Stern

[57] ABSTRACT

An adjusting and centering mechanism for a sliding advance lock of a servo drum brake, has a pawl drive which cooperates with toothed adjusting wheels. The pawl drive is actuated when the sliding advance lock is axially displaced in consequence of actuation of the brake. When the brake is actuated the pawl drive produces a force-dependent adjustment which compensates for wear of the brake linings. The pawl drive has two spring-loaded two-armed levers. A spring engages the arm of each adjusting lever which bears an abutting-region, and the spring holds the lever abuttingly against an element connected to the sliding advance lock, so that the spring tends toward relaxation as the element is displaced axially.

2 Claims, 3 Drawing Sheets

ADJUSTING AND CENTERING MECHANISM ON THE SLIDING ADVANCE LOCK OF A SERVO DRUM BRAKE

BACKGROUND OF THE INVENTION

This invention relates to an adjusting and centering mechanism for a sliding advance lock of a servo drum brake, which lock is mounted so as to be axially slidable against the prestressing force of a centering spring in a fixed guide bracket, wherein the subject mechanism is comprised of:

An adjusting nut for each advance direction, into which nut a rotationally rigid threaded bolt is screwed which engages the end of the respective brake shoe, and which nut bears a coaxial toothed adjusting wheel, which has unidirectionally acting ratchet teeth.

Two two-armed adjusting levers, each swingably mounted on the guide bracket by means of an associated bolt, and each subjected to the force of a spring, wherein one arm of each adjusting lever has a pawl which engages the ratchet teeth of one of the two toothed adjusting wheels, and the other arm of each adjusting lever has an abutting-region which can abut against a structural element affixed to the subject and adjusting and centering mechanism, whereby when the adjusting and centering mechanism undergoes an axial displacement one of the two adjusting levers undergoes an angular displacement over its associated toothed adjusting wheel such that the wheel is rotated in the direction of unscrewing of the threaded bolt, wherein the engagement of the pawls and the toothed adjusting wheels is configured such that when a pawl is moved as a consequence of an actuation of the brake this pawl engages a steep side of a tooth of the said wheel, and when moved as a consequence of a release of the brake, the pawl engages a shallowly sloped side of a tooth (or teeth) of said wheel.

An adjusting and centering mechanism of this type is disclosed in German OS 40 17 096. In that mechanism, each adjusting lever has a control lever associated with it, with the adjusting lever and control lever being connected hinge-like by a tensile spring. The prestressing force of the tensile spring, which is always opposed to the force of the centering spring, urges the adjusting lever against a guide bracket, whereby the adjusting lever abuts against the guide bracket itself or against a part (boss bushing) on the toothed adjusting wheel, with a predetermined detent play in said abutting serving as the basic clearance.

Because the force of the tensile spring on the adjusting lever acts always in the direction of the abutting of the lever, and thereby against the force of the centering spring, when the adjusting and centering mechanism is displaced axially, the force of the tensile spring must always be overcome by the toothed adjusting wheel or the boss bushing in order to initiate an angular excursion of the adjusting lever for the adjusting process. Another disadvantage of this known adjusting mechanism is that the size of the basic clearance between the detents of the adjusting lever and the associated sliding element is predetermined. Adjustment occurs only if the axial displacement of the subject adjusting and centering mechanism exceeds the basic clearance.

German Patent 2,311,166 discloses an adjusting device which is excursion-dependent, accomplishing the adjustment by means of double levers. Here too the size of the basic clearance is provided by boss elements, and the spring force acting on the double lever opposes the sliding advance movement.

German Patent 3,112,550 discloses an excursion-dependent adjusting mechanism wherein the adjusting levers are disposed at 90° with respect to each other on the guide bracket. When the sliding advance lock undergoes an axial displacement, the levers are carried along by means of a connecting lug which is coupled with the toothed adjusting wheel and engages an opening in the lever with a play which determines the basic clearance.

Other excursion-dependent adjusting mechanisms wherein the adjusting levers are swung via boss elements are described in U.S. Pat. Nos. 3,326,331, 3,712,425, 4,570,506 and 4,919,237 and British Patent 2,161,874.

All of these known adjusting mechanisms have the disadvantage that when the sliding advance lock is displaced axially the advance of the adjusting lever which occurs is necessarily accomplished by the element (boss bushing, toothed adjusting wheel, pin, etc.) against which the adjusting lever abuts under the prestressing force of the associated spring.

SUMMARY OF THE INVENTION

An underlying object of the present invention is to provide an adjusting mechanism of the type described wherein the force of the springs associated with the adjusting levers does not oppose the axial displacement of the sliding advance lock, and wherein the angular displacement of each adjusting lever when performing a force-dependent adjustment is accomplished via an additional spring force component which acts in the direction of the axial displacement.

According to the present invention, the spring which engages the arm of each adjusting lever tends towards relaxation when the adjusting element is displaced axially.

When the brake is actuated and the sliding advance lock undergoes an axial displacement, a component of the spring force acts on the adjusting levers to accomplish adjustment, wherewith each adjusting lever presses with its pawl element against a steep side of the associated toothed adjusting wheel. When the thread friction between the threaded bolt and the adjusting nut increases, the result is to prevent excessive adjustment, because the spring force component acting on the adjusting levers is not sufficient to overcome this thread friction so as to further rotate the toothed adjusting wheel; consequently the abutting regions relating the centering spring and the adjusting lever are moved axially apart. Each adjusting lever is "floatingly" mounted, so that it automatically follows the axial displacement (of the sliding advance lock) automatically under the prestressing force of its associated spring.

In the case of an excessive brake actuation, the proportion of the axial excursion by which proportion the centering spring moves away from the abutting-region of the adjusting lever thus does not produce an adjustment. This separation increase forms the force-dependent coupling. The spring forces are chosen such that the spring force of the centering spring is greater than the force exerted on the adjusting levers by tensile or compressive springs. In contrast to the state of the art, an adjustment does not occur only if a basic clearance is exceeded, but gradually over the tooth separation distance.

BRIEF DESCRIPTION OF DRAWINGS

Two preferred exemplary embodiments of the invention are illustrated in the drawings, and will be discussed in further detail below.

DESCRIPTION OF PREFERRED EMBODIMENTS

Figure 1:
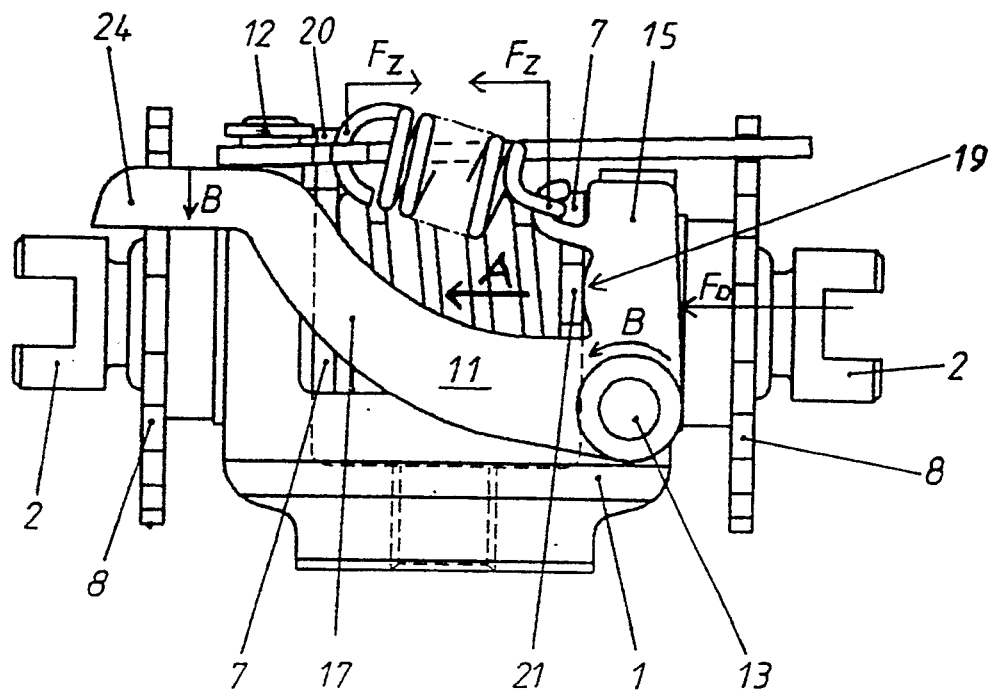
FIG. 1 is an elevational view of an adjusting and centering mechanism.

A guide bracket 1 having an approximately U-shaped cross section is disposed between the brake shoes of a servo drum brake, opposite to the spreading mechanism, and is rigidly affixed to the brake anchor plate. A sliding advance lock is housed in guide bracket 1, which lock is slidable in the axial direction whereby it transfers the brake application force from the given primary shoe to the secondary shoe. The sliding advance lock is in the form of an adjusting and centering mechanism wherewith when the brake lining on one of the brake shoes undergoes wear the sliding advance lock increases its axial length toward the side on which the wear is occurring, with regard to its centered position, and thereby maintains a constant brake clearance for each of the two brake shoes.

Respective threaded bolts 2 are disposed on each of the two ends of the brake shoe, and are rotationally rigidly screwed into corresponding adjusting nuts 3. The two adjusting nuts 3 are rotatably mounted in a sliding bushing 4 and each has a boss 5 against which the sliding bushing 4 abuts.

In its middle region the sliding bushing 4 accommodates a centering spring 6 which abuts at each of its ends against the guide bracket 1, via a boss bushing 7 (or two separate half rings). With this configuration, the centering spring brings about centering of the sliding advance lock which lock is comprised of the threaded bolts 2, the adjusting nuts 3 and the sliding bushing 4; the centering is accomplished via the boss bushing (or ring halves) which in turn abut(s) against the boss 5 of the adjusting nut 3. The braking force is transmitted from the threaded bolt 2 which is disposed nearest to the primary brake shoe, and via the respective adjusting nut, the boss 5, the sliding bushing 4, and the similar parts of the secondary shoe which are disposed on the other end.

Figure 2:
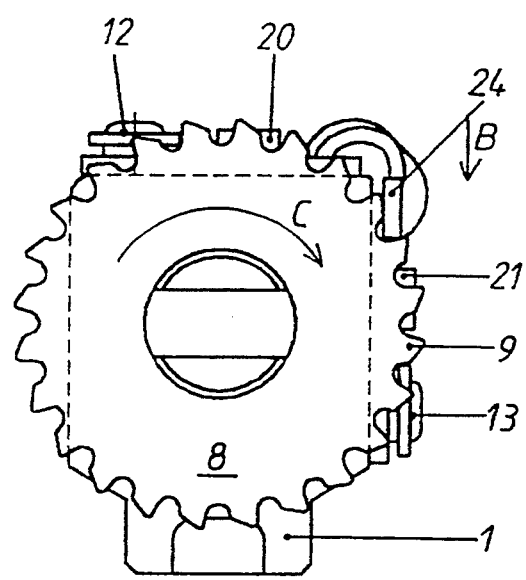
FIG. 2 is a right side elevational view of the mechanism according to FIG. 1.

A respective toothed adjusting wheel 8 is attached coaxially to each adjusting nut 3, wherewith the teeth of the wheels 8 comprise one-sided ratchet teeth 9 (of a sawtooth configuration, see FIG. 2). The direction of the ratchet teeth depends on the direction of the thread between the threaded bolt 2 and the adjusting nut 3.

In any event, the arrangement is devised such that when the sliding advance lock is displaced axially, viz, when the brake is actuated, a rotational movement of the toothed adjusting wheel 8 is produced in the direction C in a manner which will be described in more detail infra, which movement results in screwing-out of the associated threaded bolt 2, thereby leading to an adjustment to equalize the wear on the brake lining(s).

The individual components of the adjusting mechanism are held together by the tensile springs (not shown) associated with the brake shoes, which springs prestessingly force the brake shoes against the spreading mechanism and against the adjusting mechanism. Accordingly, the thread friction between the threaded bolt 2 and the adjusting nut 3 is a function of the force of these tensile springs.

Figure 3:
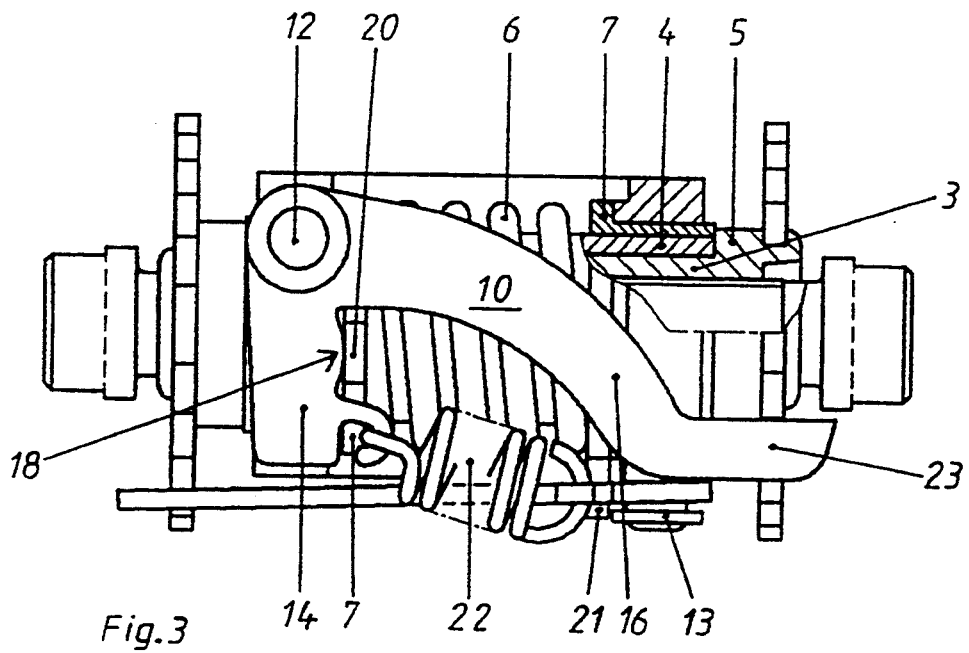
FIG. 3 is a partial cross sectional plan view of the mechanism according to FIG. 1.

In the embodiment illustrated in FIGS. 1-3, two L-shaped adjusting levers (10, 11) are anchored to the guide bracket 1 by means of bolts (12, 13) so as to be swingable in responsive planes which are a mutual 90° angle. Each adjusting lever (10, 11) has a short arm (14, 15) and a long arm (16, 17). The short arm (14, 15) of each adjusting lever (10, 11) and for abutting against the guide bracket.

Each adjusting lever (10, 11) has an abutting-region (18, 19) on its short arm (14, 15) which region is disposed at the middle of the centering spring 6. This abutting region (18, 19) may abut against the radially projecting boss of the boss bushing 7, or against a radially projecting collar (20, 21) on the boss bushing 7, or against a larger disc which is disposed between the centering spring 6 and the boss bushing 7.

A tensile spring 22 is disposed diagonally between the short arms (14, 15) of the two adjusting levers, which prestresses the two adjusting levers in the direction of the centering spring 6, with the spring force $F_z$. The long arms (16, 17) of the two adjusting levers (10, 11) extend over the region of the centering spring 6, and bear pawl members (23, 24) at their respective free ends, which pawl members press against the steep sides of the ratchet teeth 9. Depending on the diameter of the toothed adjusting wheels 8, the pawls (23, 24) may be offset with respect to the long arms (16, 17).

Figure 4:
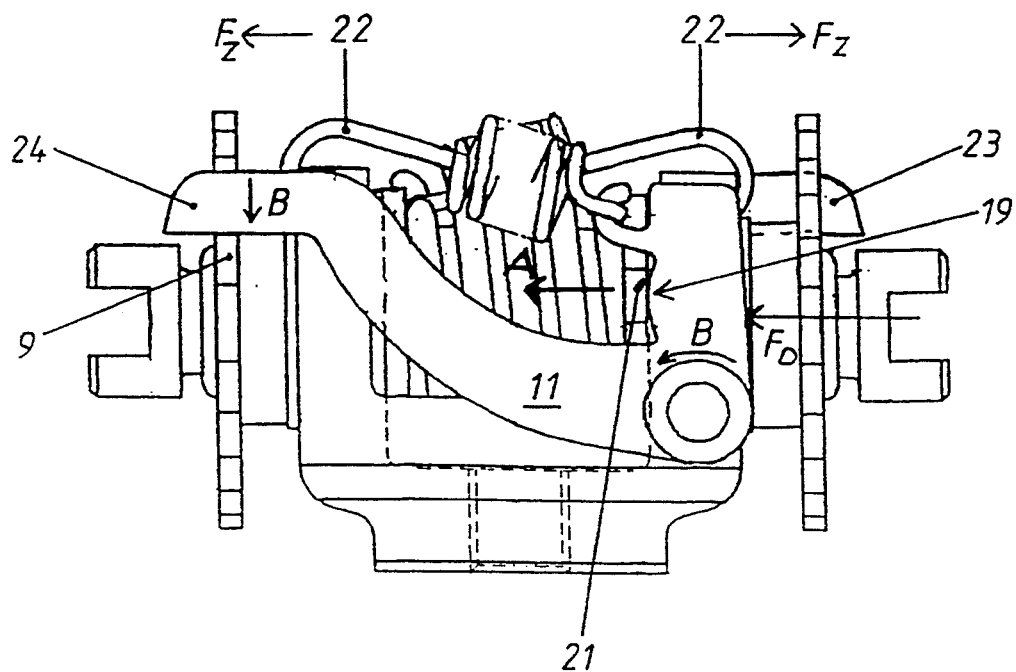
FIG. 4 is an elevational view of a second embodiment of an adjusting and centering mechanism.
Figure 5:
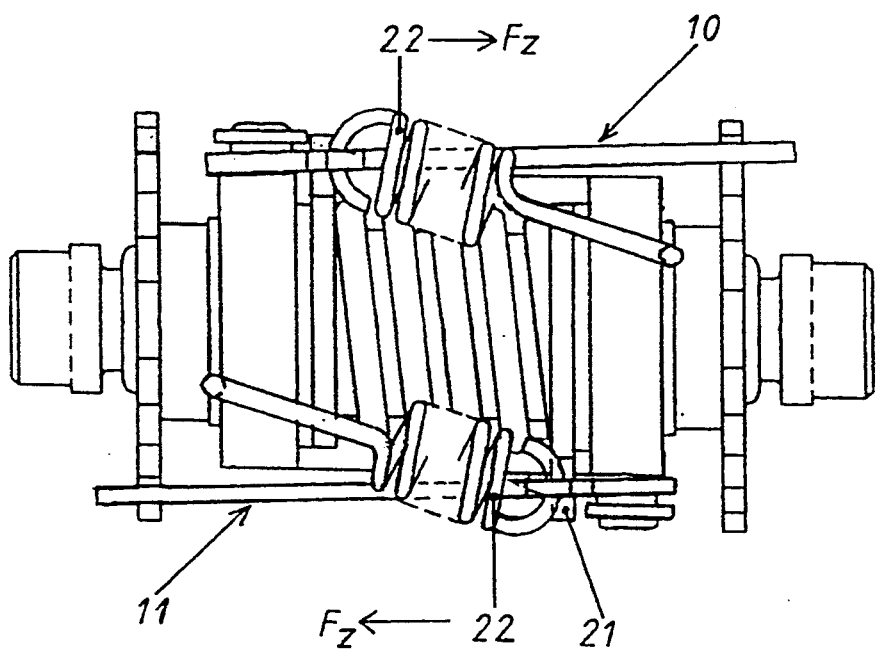
FIG. 5 is a plan view of the mechanism of FIG. 4.

In the variant embodiment illustrated in FIGS. 4 and 5, the basic structure is the same as that of the embodiment described supra, but the adjusting levers (10, 11) are disposed on opposite ends of the guide bracket 1.

The described adjusting mechanism operates as follows:

When the brake is actuated and the sliding advance lock is moved in the direction of arrow A from right to left against the prestressing force of the centering spring 6, then the right threaded bolt 2 presses the sliding bushing 4 and the boss bushing 7 in the same direction via the boss 5 of the adjusting nut 3. In the process the radial collar 21 on the boss bushing 7 is moved axially away from abutment against the guide bracket 1.

Because the abutting-region 19 of the adjusting lever 11 is held against the radial collar 21 under the prestressing-force of the tensile spring 22, the component $F_z$ of the spring force of the tensile spring 22 acts on the short arm 15 through the displacement of the centering spring 6. Consequently, the adjusting lever 11 is swung around the bolt 13 in the direction of arrow B, so that the pawl 24 presses against the steep side of one of the ratchet teeth 9 of the ratchet wheel. This causes the toothed adjusting wheel 8 to rotate in the direction of the arrow C so as to screw the threaded bolt 2 out of the adjusting nut 3.

When the left brake lining (not shown) presses against the brake drum, there will be no further rotation or adjustment as the braking force is increased, because the thread friction between the adjusting nut 3 and the left threaded bolt 2 will increase so as to neutralize ("exceed") the force of the tensile spring 22 which exerts a torque on the adjusting lever 11 tending to cause said lever to undergo an angular displacement. When the sliding advance lock is further displaced axially in consequence of an expansion of the brake drum, the radial collar on the boss bushing 7 is moved farther (in the direction of arrow A) from the abutting-region 19 of the adjusting lever 11, but the force of the tensile spring 22 is no longer sufficient for the adjusting lever 11 to be able to "floatingly" follow this displacement. Thus, the action of the adjusting lever 11 is de-coupled in a force-dependent fashion, as the distance between the radial collar 21 on the boss bushing 7 and the abutting-region 19 increases.

When the brake is released, the components of the sliding advance are pressed back into their starting positions by means of the centering spring 6. Only when this process eventually causes the separation between the radial collar 21 on the boss bushing 7 and the abutting-region 19 of the adjusting lever 11 to be eliminated does the boss bushing 7 push the adjusting lever 11 rightward against the force of the tensile spring 22. When this occurs, the adjusting lever 11 is displaced angularly and its pawl slides over the shallowly inclined side of a ratchet tooth (or teeth) 9 of the toothed ratchet wheel, with the magnitude of the displacement corresponding to the wear on the brake lining during the braking process. An adjustment corresponding to this displacement is then produced immediately upon the next actuation.

The force relationship between the tensile spring and the return spring (not shown) associated with the brake linings is chosen such than an unintended reverse rotation of the toothed adjusting wheel 8 cannot occur when the pawl 24 is resting against the shallowly inclined side of a tooth 9 of the ratchet wheel and/or when said pawl jumps over into the next tooth gap.

The adjustment in the case of the other brake lining takes place via the other adjusting lever, with the braking direction being the opposite braking direction.

The above-described operation of the adjusting mechanism is similarly applicable for the variant illustrated in FIGS. 4 and 5.

The size of the brake clearance is determined solely by the spacing of the teeth 9 on the ratchet wheel, whereby the clearance may be maintained quite small, and is nearly constant. This has a beneficial effect of uniformity of the brake actuating stroke.

When the brake linings are replaced, the adjusting nuts 3 must be screwed back into the mechanism. Because each toothed adjusting wheel 8 must be rotated back in the engaging direction of the ratchet, the pawls 24 must be lifted over the tooth gaps to allow the toothed adjusting wheels to be rotated (in the direction opposite to the arrow C).

In a deviation from the two embodiments illustrated, the two adjusting levers may be associated with compression springs instead of tensile springs. The compression springs would act on the levers with a spring force component $F_d$ in the sliding advance direction to engage with an element of the subject adjusting and centering mechanism.

I claim:

1. An adjusting and centering mechanism for a sliding advance lock of a servo drum brake, the lock being mounted in a guide bracket to be axially slidable against a prestressing force of a centering compression spring, the mechanism comprising:

respective adjusting nuts for each advance direction, into each of which nuts a rotationally rigid threaded bolt is screwed to engage the end of a respective brake shoe, and each of which nuts carries a toothed coaxial adjusting wheel, which wheel has unidirectionally acting ratchet teeth; two two-armed adjusting levers, each swingably mounted on the guide bracket, and being engaged respectively by opposite ends of an adjustment spring, wherein one arm of each adjusting lever has a pawl which engages the ratchet teeth of one of the two adjusting wheels, and the other arm of each adjusting lever has an abutting-region which can abut against a respective axially movable structural element carried by the sliding advance lock; whereby when the sliding advance lock undergoes an axial displacement, one of the two adjusting levers undergoes an angular displacement over its associated toothed adjusting wheel such that the wheel is rotated in the direction to unscrew the associated threaded bolt, wherein the engagement of the pawls and the toothed adjusting wheels is configured such that when a pawl is moved as a consequence of an actuation of the brake the pawl engages a relatively steep side of a tooth of said wheel, and when moved as a consequence of a release of the brake the pawl engages a relatively shallow side of a tooth of said wheel; characterized in that the adjustment spring has a contracting spring force urging the respective other arms of the adjusting levers inwardly towards one another, that the respective structural elements are located between said other arms and are engaged by said other arms resisting said spring force and that axial movement of a respective one of the bolts as a consequence of brake actuation effects axial movement of the respective structural element inwardly away from the respective other arm to provide said angular displacement of the respective adjusting lever by contraction of the adjustment spring.

2. A mechanism according to claim 1; characterized in that the two adjusting levers are swingably mounted on two neighboring sides of the guide bracket.

* * * * *